United States Patent [19]

Gergele

[11] Patent Number: 4,574,921
[45] Date of Patent: Mar. 11, 1986

[54] JACK FOR CROWN OR DISK BRAKES

[75] Inventor: Jean Gergele, St-Hyppolyte, France

[73] Assignee: Compagnie Generale des Etablissements Michelin, Clermont-Ferrand, France

[21] Appl. No.: 654,310

[22] Filed: Sep. 25, 1984

Related U.S. Application Data

[63] Continuation-in-part of Ser. No. 455,256, Jan. 3, 1983, abandoned.

[30] Foreign Application Priority Data

Jan. 18, 1982 [FR] France ............................... 82 00938

[51] Int. Cl.$^4$ ............................................ F16D 65/54
[52] U.S. Cl. .............................. 188/71.8; 188/196 P
[58] Field of Search ...................... 92/13.1, 13.3, 13.6; 188/71.8, 79.5 GE, 196 A, 196 P, 366

[56] References Cited

U.S. PATENT DOCUMENTS 2,766,854  10/1956  Roumens et al. ............... 188/196 A
4,208,952   6/1980  Ditlinger ..................... 188/196 A X

FOREIGN PATENT DOCUMENTS 1309217  3/1973  United Kingdom .
2003231  3/1979  United Kingdom ............... 188/71.8

Primary Examiner—Duane A. Reger
Attorney, Agent, or Firm—Brumbaugh, Graves, Donohue & Raymond

[57] ABSTRACT

A first piston having a passageway for hydraulic fluid and a second piston slide within a cylindrical body of a jack for crown or disk brakes provided with a spring for opening the brake clamp or yoke. An extension of the first piston slides within a guide and actuates a movable pusher. A closure seal closes the passageway when the first piston touches the second piston. The axial friction force of the second piston on the cylindrical body is more than the force of the spring. The axial friction force of the second piston on the cylindrical body is more than the sum of the axial friction force of the first piston on the cylindrical body and the axial friction force of the extension on its guide, whereby the axial displacement of the first piston occurs before the axial displacement of the second piston when said pistons are actuated by same pressure. The displacement of the second piston takes up the wear of the brake linings while the displacement of the first piston effects the clamping of the brake linings on the crown or disk.

9 Claims, 7 Drawing Figures

S = S1 + S2

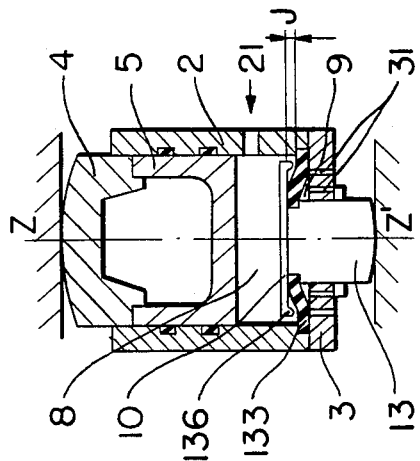
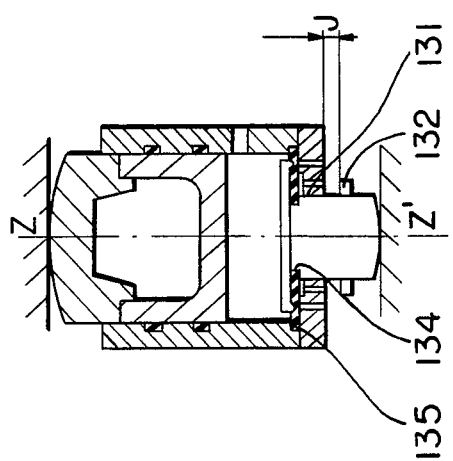
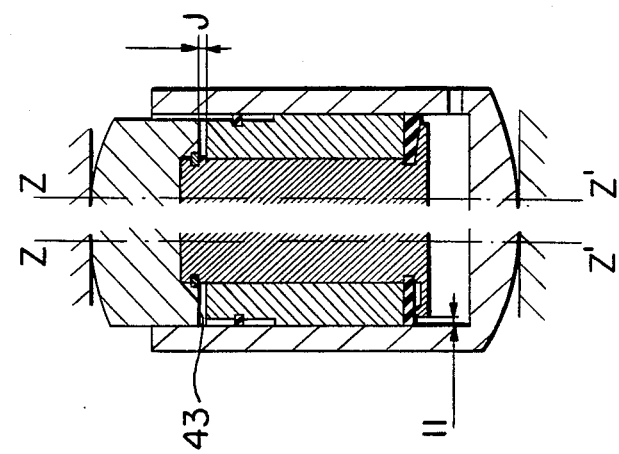
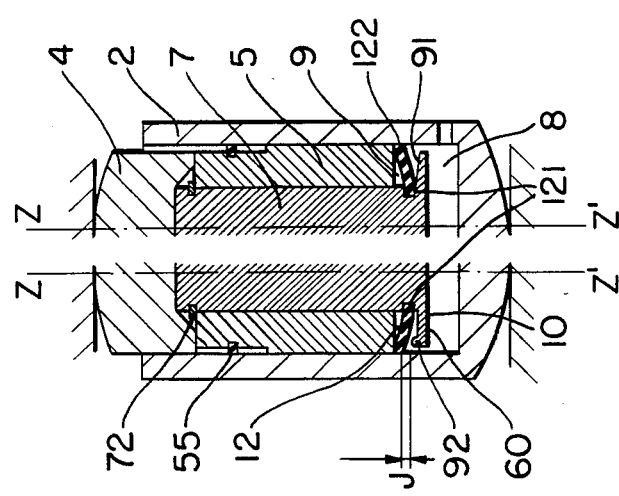

JACK FOR CROWN OR DISK BRAKES

This application is a continuation-in-part application of U.S. application Ser. No. 455,256, filed Jan. 3, 1983, now abandoned.

The present invention relates to improvements in crown or disk brakes intended to assure the braking of a rotating assembly, for instance a vehicle wheel.

A crown brake comprises essentially a cylindrical crown which is coaxial to the rotating assembly and rigidly connected to it, a clamp provided with friction linings and at least one hydraulic jack actuating the clamp. A disk brake comprises essentially a flat circular disk concentric to the rotating assembly and rigidly connected to it, a yoke provided with friction linings and at least one hydraulic jack actuating the friction linings. Upon braking, the linings, which are immobilized in rotation in the clamp or yoke, rub against the braking tracks provided on opposite sides of the brake crown or disk.

The invention more particularly relates to jacks actuating brakes of the two types described above. In these two types of brakes, the linings as a matter of fact rub slightly at all times on braking tracks when braking maneuvers are not being effected. This slight rubbing is known as "licking." The licking, on the one hand, uselessly consumes energy while, on the other hand, it causes local wear of the braking tracks and therefore unsatisfactory operation of the brake.

The customary solution consists in providing sufficient clearance or play between the linings and the corresponding braking tracks in order to prevent licking. This is done, for instance, by means of return devices arranged within the jack which actuates the brake. These devices may increase the response time of the brake. Furthermore, they frequently introduce too little clearance to remain always effective.

Thus the object of the invention is to avoid the licking of the linings on the braking tracks while assuring a response time of the brake which is constant, short and independent of the wear of the lining.

The invention therefore concerns a jack for crown or disk brakes provided with a spring for opening the brake clamp or yoke comprising an internally cylindrical body provided with a bottom and an inlet for pressurized hydraulic fluid, two pushers at least one of which is movable in axial direction and a first piston movable in axial direction with friction in the cylindrical body, characterized by the fact that between this first piston and the movable pusher there is arranged a second piston which slides axially with friction within the cylindrical body;

the first piston has a cylindrical extension of a diameter less than that of the inside of the cylindrical body and has a passageway for the hydraulic fluid from one of its faces to the other;

a seal for closing the passageway of the first piston is arranged opposite the passageway so as to close the passageway when the jack is in braking position and to free the passageway when the jack is in position of rest, the stroke of the first piston between these two positions corresponding to the desired clearance between friction linings of the brake and the crown or disk;

the axial heights and the strokes of the two pistons within the cylindrical body are such as to provide a chamber for the hydraulic fluid on each of the faces of the first piston;

the extension of the first piston slides axially with friction within a guide;

the axial friction force of the second piston on the cylindrical body is more than the force of the opening spring; and the axial friction force of the second piston on the cylindrical body is more than the sum of the axial friction force of the first piston on the cylindrical body and the axial friction force of the extension on its guide, whereby the axial displacement of the first piston occurs before the axial displacement of the second piston when said pistons are actuated by same pressure.

The drawing together with the portion of the description referring to the drawing illustrates schematically various embodiments of the invention. Thus:

FIGS. 4A and 4B and 5A and 5B show two other embodiments of this jack, also in position of rest and of braking.

Figure 1:
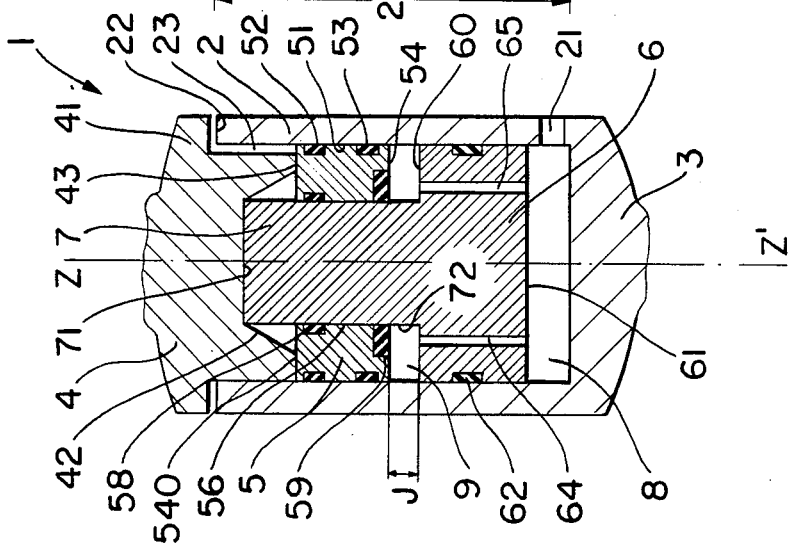
FIG. 1 is a cross section along its longitudinal axis of action of a jack which is at rest, the brake linings being new.
Figure 2:
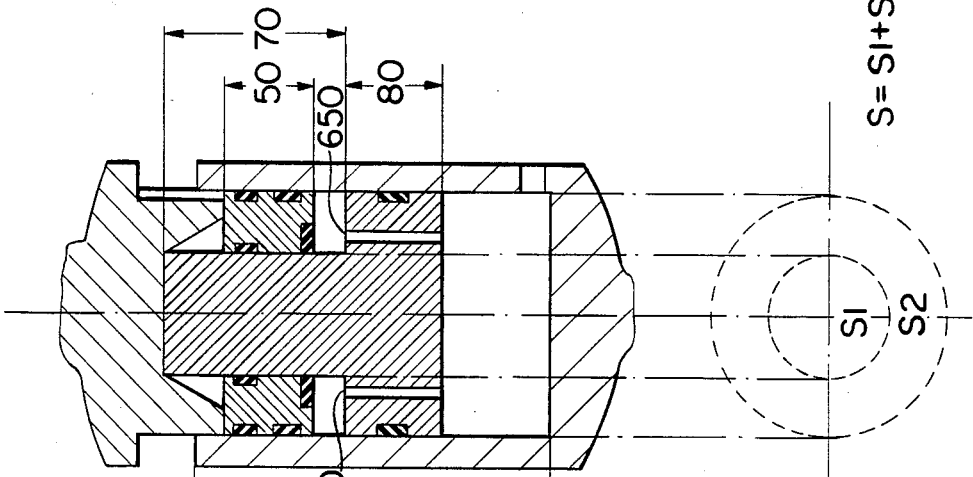
FIG. 2 shows the same jack at rest, the brake linings being partially worn.
Figure 3:
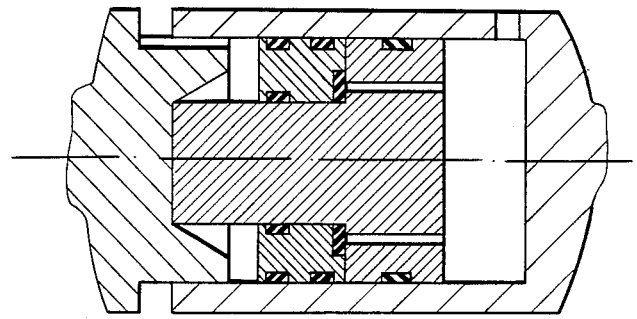
FIG. 3 shows the same jack during the course of a braking maneuver.

The jack 1 of FIGS. 1 to 3 comprises an internally cylindrical body 2 of revolution around the longitudinal axis ZZ'. This cylindrical body 2 is closed at one end by a bottom 3.

The other end, which is open, serves as guide for a pusher 4 which is movable in axial direction within the cylindrical body 2. Within the cylindrical body 2 and snugly fitting its inner diameter there can be noted a first piston 6 provided with an extension 7 and a second piston 5, in accordance with the invention.

The bottom 3 of the cylindrical body 2 forms the fixed pusher. The bottom 3, on the one hand, as well as the movable pusher 4, on the other hand, are connected by known means to the brake clamp or yoke (not shown). The inlet 21 for the pressurized hydraulic fluid intended to actuate the jack 1 is arranged in the cylindrical body 2 near the bottom 3 and in the chamber 8 of the cylindrical body 2 between the first piston 6 and the bottom 3 in such a manner as to act on the face 61 of the first piston 6 which faces the bottom 3 of the cylindrical body 2.

The second piston 5, which is of ring shape, is arranged between the first piston 6 and the movable pusher 4. The first piston 6 is provided on its face 60, which faces the second piston 5, with a coaxial extension 7. This extension 7, which is of a diameter less than that of the interior of the cylindrical body 2, slides axially in the second ring-piston 5. For this purpose, the second ring-piston 5 is provided with an internal borehole 56 which is coaxial to the first piston 6 and to the extension 7. This internal borehole 56 forms the guide for the extension 7 in accordance with the invention.

The second ring-piston 5 has an axial height 50 less than the axial height 70 of the extension 7. The extension 7 of the first piston 6 bears the movable pusher 4. For this purpose, the movable pusher 4 has a recess 42 in which the free end 71 of the extension 7 is housed, the other end 72 of the extension 7 being rigidly connected to the first piston 6.

The axial heights 50, 80, 70 of the second ring-piston 5, of the first piston 6 and of its extension 7, respectively, are selected in such a manner that, with due consideration of the axial height 20 of the cylindrical body 2, when the stop 43 of the movable pusher 4 is in contact with the face 540 of the second ring-piston 5, chambers 8, 9 are present which are capable of receiving the hydraulic fluid under pressure, the one chamber 8 being contained axially between the bottom 3 of the cylindrical body 2 and the corresponding face 61 of the first piston 6 and the other chamber 9 being contained axially between the face 54 of the second ring-piston 5 and the other face 60 of the first piston 6. Furthermore, the sliding length J of the extension 7 in the second ring-piston 5, that is to say the height J of the chamber 9 contained between the second ring-piston 5, the first piston 6 and the cylindrical body 2, is limited by the free stop-forming end 43 of the recess 42 of the movable pusher 4 in which recess 42 the extension 7 lies.

The cylindrical body 2 in the portion thereof guiding the movable pusher 4 and/or the movable pusher 4 are provided with a groove or vent conduit such as 23 permitting the circulation of the air contained between the second ring-piston 5 and the movable pusher 4 when the second ring-piston 5 and/or the movable pusher 4 slide in the cylindrical body 2. Furthermore, the first piston 6 has a seal 62 which rubs on the cylindrical body 2.

As passageway between the faces 60, 61 for the hydraulic fluid between the two chambers 8 and 9, the first chamber 8 being contained between the face 61 of the first piston 6 and the bottom 3 of the cylindrical body 2 and the second chamber 9 being contained between the face 60 of the first piston 6 and the face 54 of the second ring-piston 5 and the cylindrical body 2, the first piston 6 has two conduits such as 64, 65 which axially traverse it from one face 60 to the other face 61. Facing these conduits 64 and 65, which are equidistant from the axis ZZ' of the jack 1, a closure seal 59 is arranged in the second ring-piston 5. The closure seal 59 effects the closing of the conduits 64, 65 when the flat face 60 of the first piston 6 places itself against the corresponding face 54 of the second ring-piston 5 due to the sliding of the extension 7 in the inner borehole 56 of the second ring-piston 5, as described below.

One skilled in the art can easily calculate the different friction forces to be obtained, taking the different surfaces on which pressure is applied into account, in order that, when the pressure increases, the first piston 6 begins moving axially, actuating the movable pusher 4 of the jack 1 before any movement of the second ring-piston 5, which stays unmoved.

In order to obtain the required friction forces, different means known per se can be used, individually or in combination. For example, one or more seals 52, 53 can be arranged between the outer wall 51 of the second ring-piston 5 and the cylindrical body 2, the total area of said seals which is in contact with the cylindrical body 2 being greater than the total area of the seals 58 located between the inner borehole 56 of the second ring-piston 5 and the extension 7. One may also use one or more seals such that the compressive force of the seal or seals 52, 53 between the second ring-piston 5 and the cylindrical body 2 is greater than the compressive force of the seal or seals 58 between the borehole 56 in the second ring-piston 5 and the extension 7. One or more seals 52, 53 of a material of higher coefficient of friction than the material of the seal or seals 58 contained between the central borehole 56 of the second ring-piston 5 and the extension 7 can also be placed between the second ring-piston 5 and the body 2.

Thus the movement of the movable pusher 4 serves to overcome the tension of the opening spring (not shown) of the brake clamp or yoke, that is to say, it takes up the anti-licking clearance of the brake linings until the face 60 of the first piston 6 comes against the opposing face 54 of the second ring-piston 5.

The circular closure seal 59 provided in the flat face 54 of the second ring-piston 5 which is directed towards the first piston 6 and opposite the passageway conduits 64, 65 of the first piston 6 then places itself over the orifices 640, 650 of these conduits 64, 65 which debouch into the chamber 9 provided between the first piston 6 and the second ring-piston 5. At the same time as this chamber 9 is suppressed, the closure seal 59 closes the conduits 64 and 65.

At this stage of the maneuver, the force F delivered by the movable pusher 4 is equal to the difference between the product of the pressure p in the remaining chamber 8 multiplied by the interior cross sectional area S of the cylindrical body 2 minus the sum Q of the sections 640, 650 and of the sections 64, 65 provided in the first piston 6 and the sum of the friction forces of the first piston 6 and of the second ring-piston 5 on the cylindrical body 2.

Thus, the jack behaves like an ordinary jack assuring the closing of the linings on the brake crown and therefore the braking. Likewise, any additional displacement of the first piston 6 in contact with the second ring-piston 5 simultaneously brings about the displacement of the second ring-piston 5 and therefore the taking up of the wear of the brake linings.

The axial displacement J of the first piston 6 towards the second ring-piston 5, that is to say the elimination of the clearance J between the two pistons 5, 6 takes place by introducing into the jack of the invention a small volume of fluid $S_1.J$ as compared with the volume $S.J$ required in the case of an ordinary jack of the same inner section S, the cross sectional area $S_1$ of the extension 7 being definitely less than the cross sectional area S of the cylindrical body 2. The result is that the time for the taking up of the anti-licking clearance is very short and is compatible with satisfactory operation of the brake.

At the end of the braking, the opening spring (not shown) of the brake clamp or yoke reestablishes the required clearance between the brake linings and the crown or disk. The movable pusher 4 as well as the first piston 6 return to their initial positions as shown in FIG. 1 when the linings are new and in FIG. 2 when the linings are worn. On the other hand, the second ring-piston 5 does not move upon the opening of the linings and limits the position of withdrawal of the movable pusher 4, abutting via the free end stop 43 of the recess 42 bearing the extension 7 of the first piston 6 against the corresponding face 540 of the second ring-piston 5, since the force R of the opening spring of the brake clamp or yoke at the level of the jack is less than the axial friction force of the second ring-piston 5 on the cylindrical body 2.

The wear of the linings as a result of the braking which has just been carried out is thus automatically compensated for in accordance with the invention and the anti-licking clearance is maintained constant.

The jack of FIGS. 4A (in open position of the linings) and 4B (in braking position) comprises, as compared with the variant of FIGS. 1 to 3, a first piston 10 whose passageway for the hydraulic fluid between the two chambers 8 and 9 is produced by peripheral radial clearance 11 between the first piston 10 and the inside of the cylindrical body 2. Stated differently, the outside diameter of the first piston 10 is less than the inside diameter of the cylindrical body 2 so as to make the exchange of hydraulic fluid possible between the two chambers 8 and 9 which, in accordance with the invention, are provided on opposite sides of the first piston.

In this variant, the closure seal which cooperates in the closing of the peripheral radial passageway 11 can, for instance, be a flat crown-shaped closure seal 12 whose inner edge is wedged into a groove 121 provided at the place where the extension 7 is implanted in the first piston 10. The face 60 of the first piston 10 which face 60 is arranged opposite the second ring-piston 5, can be conical 91 towards the outside of the first piston 10 (right-hand portion of FIGS. 4A and 4B) or be provided with a peripheral rib 92 (left-hand portion of FIGS. 4A and 4B). When, after sliding of the extension 7 in the second ring-piston 5 for the take-up of the corresponding anti-licking clearance J, the hydraulic fluid is expelled from the chamber 9 between first piston 10 and second ring-piston 5, the closure seal 12, whose outer edge 122 rubs against the inside of the cylindrical body 2, comes against the face 60 of the first piston 10 and closes the passageway 11 (FIG. 4B).

In this variant, the suitable friction in accordance with the invention, between the outside of the second ring-piston 5 and the cylindrical body 2 can be obtained by a slit elastic metal ring 55. In accordance with the invention, the stroke J (FIG. 4A) of the extension 7 in the second ring-piston 5 is equal to the clearance J (FIG. 4B) between the second ring-piston 5 and the axial stop 43 formed by the inner face of the movable pusher 4. However, this axial stop may also be a pin, a rib or a ring 72 encircling the free end of the extension 7 in contact with the movable pusher 4 (FIG. 4A).

The variant of the jack according to the invention which is shown in FIGS. 5A (linings open) and 5B (linings closed during the course of the braking) differs essentially from the preceding one, first of all by the existence of two movable pushers and then by the guidance of the extension of the first piston 10 and furthermore by the use of the extension itself as a second movable pusher. It results from this, furthermore, that the second piston 5 is without a central borehole and directly bears the first movable pusher 4, that the chamber 8 with the hydraulic fluid inlet 21 is provided between the opposing faces of the first piston 10 and the second piston 5, that the chamber 9 corresponding to the anti-licking clearance J is provided between the face of the first piston 10 facing the bottom 3 of the cylindrical body 2 and the bottom 3.

The second movable pusher or extension 13 of the first piston 10 is guided in an interior borehole 131 at the bottom 3 of the cylindrical body 2. In this borehole 131 the extension 13 slides axially with, in accordance with the invention, a friction force which is less than that of the second piston 5 in the cylindrical body 2. According to the invention, the extension 13 comprises, for example, on the outside of the bottom 3, a pin, ring or rib 132 which limits its sliding J in the bottom 3 corresponding to the proper clearance between linings and brake crown or disk in order to avoid the licking of the linings.

The second piston 5 which rubs with hard friction in the cylindrical body 2 moves towards the outside of the jack as the linings become worn, pushing the first movable pusher 4 in front of it.

The first piston 10, whose passageway 11 for the hydraulic fluid between the two chambers 8 and 9 is also of the peripheral radial clearance type as in the jack of FIGS. 4A and 4B, together with its extension/second movable-pusher 13 is propelled upon each braking (FIG. 5B) in the direction towards the other end of the jack until the peripheral rib 136 arranged on the face of the first piston 10 facing the bottom 3 comes against a crown-shaped closure seal 133. Thus this closure seal 133 closes the peripheral radial passageway 11 for the hydraulic fluid. The crown closure seal 133 in this variant has its inner edge 134 wedged in a groove provided at the place where the extension 13 is implanted in the first piston 10. The outer edge 135 of the crown closure seal 133 is held between the bottom 3 and the cylindrical body 2.

The bottom 3 has vent conduits 31. They permit the air contained between the crown closure seal 133 and the bottom 3 to escape during the clearance-take-up operation of the braking maneuvers.

What is claimed is:

1. A jack for crown or disk brakes provided with a spring for opening the brake clamp or yoke comprising an internally cylindrical body provided with a bottom and an inlet for pressurized hydraulic fluid, two pushers at least one of which is movable in axial direction and a first piston movable in axial direction with friction within the cylindrical body, characterized by the fact that between this first piston and the movable pusher there is arranged a second piston which slides axially with friction within the cylindrical body;

the first piston has a cylindrical extension of a diameter less than that of the inside of the cylindrical body and has a passageway for the hydraulic fluid from one of its faces to the other;

a seal for closing the passageway of the first piston is arranged opposite the passageway so as to close the passageway when the jack is in braking position and to free the passageway when the jack is in position of rest, the stroke of the first piston between these two positions corresponding to the desired clearance between friction linings of the brake and the crown or disk;

the axial heights and the strokes of the two pistons in the cylindrical body are such as to provide a chamber for the hydraulic fluid on each of the faces of the first piston;

the extension of the first piston slides axially with friction within a guide;

the axial friction force of the second piston on the cylindrical body is more than the force of the opening spring; and the axial friction force of the second piston on the cylindrical body is more than the sum of the axial friction force of the first piston on the cylindrical body and the axial friction force of the extension on its guide, whereby the axial displacement of the first piston occurs before the axial displacement of the second piston when said pistons are actuated by same pressure.

2. A jack according to claim 1, characterized by the fact that the extension of the first piston is arranged on that face of the first piston which faces the second piston and bears the movable pusher, the other pusher which is stationary being formed by the bottom of the cylindrical body;

the guide for the extension is formed by a borehole within the second piston;

the movable pusher or the extension comprises an axial stop which limits the axial length of sliding of the extension in the second piston;

the length of axial sliding of the extension of the first piston in the second piston is equal to the stroke of the jack corresponding to the desired clearance between the friction linings of the brake and the crown or disk; and the inlet for the hydraulic fluid is arranged between the bottom of the cylindrical body and the first piston.

3. A jack according to claim 1, characterized by the fact that the extension of the first piston is arranged on that face of the first piston which faces the bottom of the cylindrical body and forms the second pusher, which is movable;

the second piston bears the first movable pusher;

the guide for the extension is formed by an inner borehole at the bottom of the cylindrical body;

the extension comprises on the outside of the bottom an axial stop which limits the axial length of sliding of the extension in the bottom;

the length of axial sliding of the extension of the first piston in the bottom is equal to the stroke of the jack corresponding to the desired clearance between the friction linings of the brake and the crown or disk; and the inlet for the hydraulic fluid is arranged between the first piston and the second piston.

4. A jack according to claim 1, characterized by the fact that the passageway for the hydraulic fluid consists of at least one conduit extending axially from face to face through the first piston.

5. A jack according to claim 1, characterized by the fact that the passageway for the hydraulic fluid is a peripheral radial clearance provided between the first piston and the cylindrical body; and the closure seal is fastened internally on the extension and rests externally against the cylindrical body.

6. A jack according to claim 2, characterized by the fact that a vent conduit is provided between that portion of the extension which protrudes beyond the second piston and the surrounding air.

7. A jack according to claim 3, characterized by the fact that the passageway for the hydraulic fluid is a peripheral radial clearance provided between the first piston and the cylindrical body;

the closure seal is fastened internally on the extension and externally between the cylindrical body and its bottom; and this bottom comprises at least one vent conduit.

8. A jack according to claim 2, characterized by the fact that the extension comprises the axial stop for the second piston.

9. A jack according to claim 1, characterized by the fact that the movable pusher comprises the axial stop for the second piston.

* * * * *